(12) United States Patent
Chakra et al.

(10) Patent No.: US 10,394,617 B2
(45) Date of Patent: *Aug. 27, 2019

(54) EFFICIENT APPLICATION MANAGEMENT

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/163,752

(22) Filed: May 25, 2016

(65) Prior Publication Data

US 2017/0123477 A1    May 4, 2017

Related U.S. Application Data

(63) Continuation of application No. 14/926,448, filed on Oct. 29, 2015.

(51) Int. Cl.
*G06F 9/48* (2006.01)
*G06F 9/50* (2006.01)
(Continued)

(52) U.S. Cl.
CPC ............ *G06F 9/5094* (2013.01); *G06F 1/329* (2013.01); *G06F 1/3228* (2013.01);
(Continued)

(58) Field of Classification Search
CPC ...... G06F 1/3228; G06F 1/3287; G06F 1/329; G06F 9/4418; G06F 9/4856;
(Continued)

(56) References Cited

U.S. PATENT DOCUMENTS

| 4,261,037 A | 4/1981 | Hicks |
| 5,717,609 A | 2/1998 | Packa et al. |

(Continued)

OTHER PUBLICATIONS

IBM, "Computer Process Power Management", an IP.com Prior Art Database Technical Disclosure, IP.Com, IPCOM000191811D, Jan. 15, 2010, 3 pages.

(Continued)

*Primary Examiner* — James J Lee
*Assistant Examiner* — Willy W Huaracha
(74) *Attorney, Agent, or Firm* — Reza Sarbakhsh

(57) ABSTRACT

A computer receives an application and system configuration detailing program applications, operating systems, and when and/or on which system an application may hibernate and/or operate. The computer determines a baseline power consumption of each of the applications on each of the applicable systems and operates the applications on the most energy efficient system. The computer monitors and displays the energy consumption of each application and determines whether the applications capable of hibernation have been idle for a period of time. If so, the computer hibernates the application until the application is awoken. If the application is incapable of hibernation nor idle, the computer compares the consumption to the determined baseline consumption of an alternative system and, if the consumption is greater than the baseline consumption of an alternative system and the application is capable of operation on the alternative system, moves operation of the application to the more efficient system.

7 Claims, 3 Drawing Sheets

(51) Int. Cl.
*G06F 1/329* (2019.01)
*G06F 1/3228* (2019.01)
*G06F 1/3287* (2019.01)
*G06F 9/4401* (2018.01)
*H04L 12/24* (2006.01)
*H04L 12/26* (2006.01)

(52) U.S. Cl.
CPC .......... *G06F 1/3287* (2013.01); *G06F 9/4418* (2013.01); *G06F 9/485* (2013.01); *G06F 9/4893* (2013.01); *H04L 41/08* (2013.01); *H04L 41/0833* (2013.01); *H04L 43/08* (2013.01); *Y02D 10/44* (2018.01)

(58) Field of Classification Search
CPC ...... G06F 9/5094; G06F 9/485; G06F 9/4893; H04L 41/08; H04L 41/0833; H04L 43/08; Y02D 10/44
USPC ........................................................ 718/104
See application file for complete search history.

(56) References Cited

U.S. PATENT DOCUMENTS

| | | | |
|---|---|---|---|
| 6,260,020 B1* | 7/2001 | Ruffin | G06Q 10/06 705/400 |
| 7,127,625 B2* | 10/2006 | Farkas | G06F 1/206 713/320 |
| 8,245,059 B2 | 8/2012 | Jackson | |
| 8,635,475 B2 | 1/2014 | Lin et al. | |
| 8,732,487 B2 | 5/2014 | Goraczko et al. | |
| 9,063,750 B2* | 6/2015 | Gupta | G06F 9/44 |
| 9,277,502 B2* | 3/2016 | Moayerzadeh Ahmadi | H04L 51/38 |
| 9,405,348 B2 | 8/2016 | Jackson | |
| 9,542,179 B2* | 1/2017 | Diewald | G06F 1/28 |
| 2003/0079151 A1* | 4/2003 | Bohrer | G06F 1/3203 713/320 |
| 2010/0235840 A1 | 9/2010 | Angaluri | |
| 2010/0318827 A1* | 12/2010 | Shah | G06F 1/3203 713/324 |
| 2011/0022870 A1* | 1/2011 | McGrane | G06F 1/3203 713/340 |
| 2011/0072378 A1* | 3/2011 | Nurminen | G06F 1/32 715/771 |
| 2013/0339759 A1 | 12/2013 | Doddavula | |
| 2017/0019296 A1* | 1/2017 | Khosrowpour | H04L 41/5096 |

OTHER PUBLICATIONS

Chakra et al., "Efficient Application Management," U.S. Appl. No. 14/926,448, filed Oct. 29, 2015.
List of IBM Patents or Patent Applications Treated as Related, May 19, 2016, 2 pgs.
Chen, Gang, et al. "Shelp: Automatic self-healing for multiple application instances in a virtual machine environment." Cluster Computing (CLUSTER), 2010 IEEE International Conference on. IEEE, 2010., pp. 97-106.

* cited by examiner

EFFICIENT APPLICATION MANAGEMENT

TECHNICAL FIELD

The present invention relates generally to energy consumption, and more particularly to efficiently managing applications to conserve energy.

BACKGROUND

In today's collaborative world, individuals run many applications. Thousands of applications have been, and likely will continue to, be developed for a variety of different needs, both business and pleasure. Often time's, users are unaware of just how many applications and processes are operating simultaneously on their system. While modern day technology has enabled computers and servers to handle the increased processing and storage needs that comes along with running many applications at once, even background applications can consume a large amount of resources and/or energy. While operating a large amount of applications for a short period of time may not significantly affect operation costs for an individual, operating multiple applications across potentially hundreds or thousands of systems within a business has the potential to significantly affect the operational costs of a business.

SUMMARY

Embodiments of the present invention disclose a method, system, and computer program product for efficient application management. A computer receives an application and system configuration detailing program applications, operating systems, and when and/or on which system an application may hibernate and/or operate. The computer determines a baseline power consumption of each of the applications on each of the applicable systems and operates the applications on the most energy efficient system available in accordance with the application and system configuration. The computer monitors and displays the energy consumption of each application and determines whether the applications capable of hibernation have been idle for a period of time. If so, the computer hibernates the application until the application is awoken. If the application is incapable of hibernation nor idle, the computer compares the consumption to the determined baseline consumption of an alternative system and, if the consumption is greater than the baseline consumption of an alternative system and the application is capable of operation on the alternative system, moves operation of the application to the more efficient system.

DETAILED DESCRIPTION

Embodiments of the present invention will now be described in detail with reference to the accompanying figures.

Figure 1:
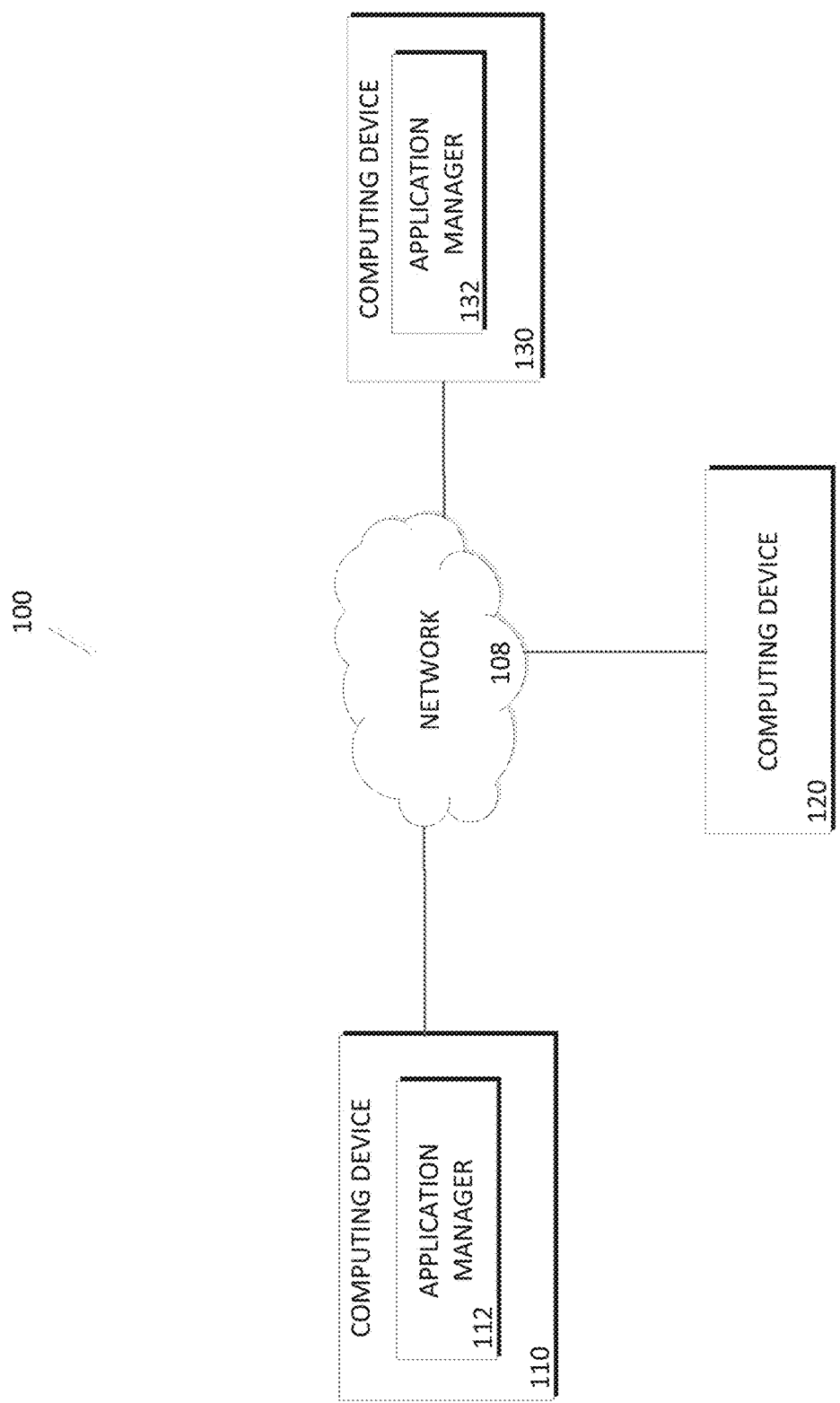
FIG. 1 illustrates application management system 100, in accordance with an embodiment of the invention.

FIG. 1 illustrates an application management system 100, in accordance with an embodiment of the invention. In the example embodiment, application management system 100 includes network 108, computing device 110, computing device 120, and computing device 130.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110, computing device 120, and computing device 130.

In the example embodiment, computing device 130 includes application manager 132 and may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 130 is shown as a single device, in other embodiments, computing device 130 may be comprised of a cluster or plurality of computing devices, working together or working separately. Computing device 130 is described in more detail with reference to FIG. 3.

Application manager 132 is a program capable of receiving application and system configurations as well as establishing a baseline energy consumption of said applications on said systems. Application manager 132 is further capable of monitoring and displaying the current energy consumption of operating applications as well as hibernating said operating applications when they are idle. Application manager 132 is additionally capable of determining whether operating an application, or the specific functionality of the application, on an alternative system is more energy efficient than the current system and determining whether switching application operation to the more efficient system is permissible. Application manager 132 is further capable of switching operation of the application to the alternative system if the switch is determined feasible and more efficient.

In the example embodiment, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in more detail with reference to FIG. 3.

Computing device 110 includes application manager 112. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Application manager 112 is a program capable of receiving application and system configurations as well as establishing a baseline energy consumption of said applications on said systems. Application manager 112 is further capable of monitoring and displaying the current energy consumption of operating applications as well as hibernating said operating applications when they are idle. Application manager 112 is additionally capable of determining whether operating an application, or the specific functionality of the application, on an alternative system is more energy efficient than the current system and determining whether switching application operation to the more efficient system is permissible. Application manager 112 is further capable of switching operation of the application to the alternative system if the switch is determined feasible and more efficient.

Figure 2:
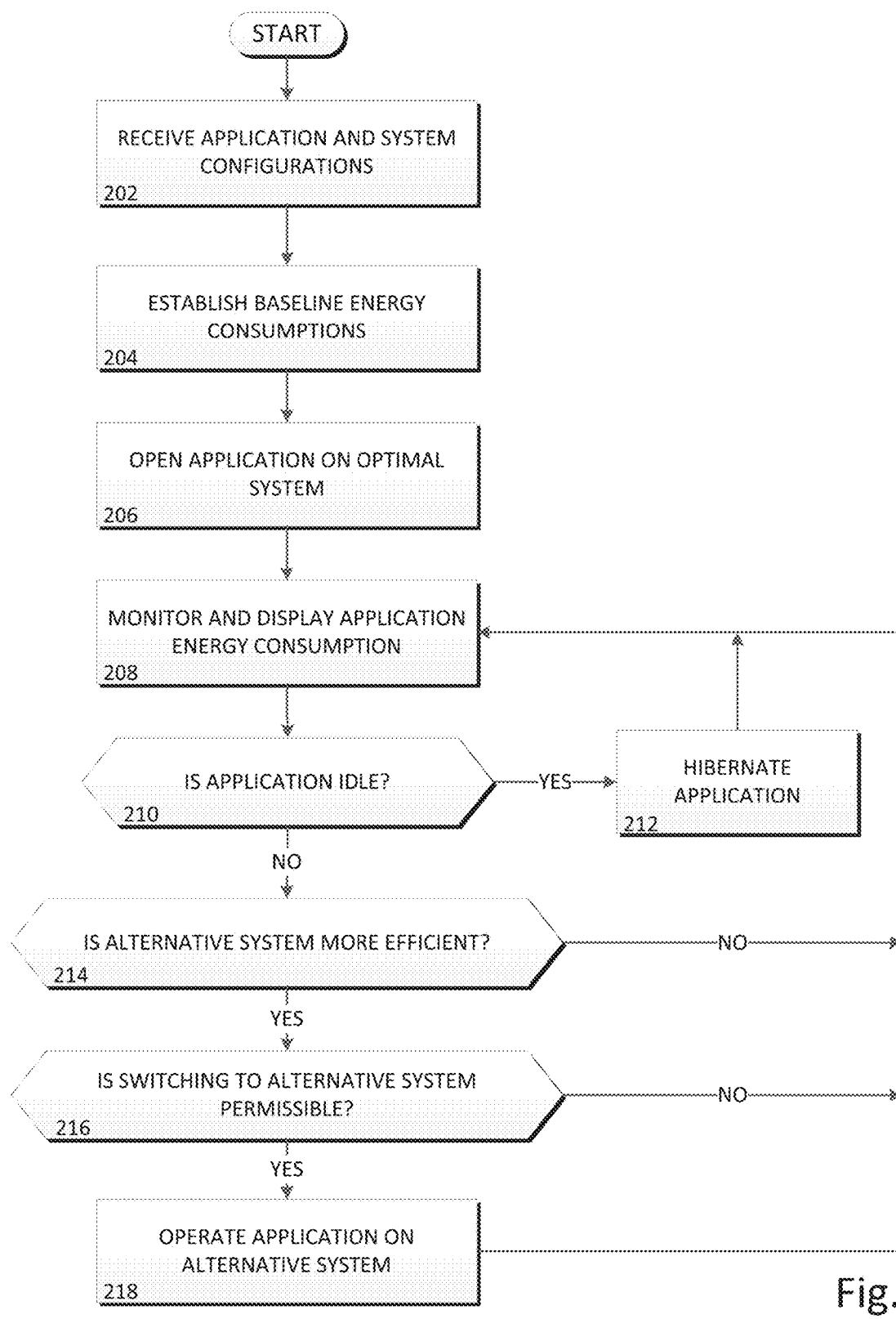
FIG. 2 is a flowchart illustrating the operations of application manager 112 of FIG. 1 in managing applications efficiently, in accordance with an embodiment of the invention.

FIG. 2 is a flowchart depicting the operation of application manager 112 in conserving energy by hibernating applications and switching operating systems, in accordance with an embodiment of the present invention.

In the example embodiment, application manager 112 receives application and system configurations via user input on computing device 110 (step 202). In other embodiments, application manager 112 may receive application and system configurations via user input remotely over a network, such as network 108. In the example embodiment, the system configuration details the systems on which applications operate, which include a local system, a cloud system, and a sibling system. In the example embodiment, the local system is represented by computing device 110 and is the device of the user, the cloud system is represented by computing device 120 and is a remote device, and the sibling system is represented by computing device 130 and is the local device of a second user. In the example embodiment, application configurations detail the applications run on said systems, such as word processors, web browsers, computer aided design applications, encryption and security applications, and other software applications. Furthermore, in the example embodiment, application and system configurations additionally detail the operational circumstances of each application with respect to each system, such as where and when each application is operable as well as where and when applications may hibernate. For example, if user Alpha and user Beta each operate computing device 110 and computing device 130 at work, respectively, and are both connected to a remote server computing device 120, then user Alpha registers computing device 110 as the local system, computing device 120 as the cloud system, and computing device 130 as the sibling system. Additionally, if user Alpha operates applications such as a web browser, a word processor, an email client, and a security application, then user Alpha may configure the web browser, word processor, and email client to operate on any of the registered systems while configuring the security application to only operate on the local system. Additionally, if user Alpha checks his email infrequently, then user Alpha may configure the email client to hibernate following fifteen minutes of inactivity.

Application manager 112 establishes the baseline energy consumptions of the applications on each system (step 204). In the example embodiment, application manager 112 establishes the baseline energy consumptions of each new application on each system by operating the application on each system and recording the energy consumption of both the overall system as well as key components of the system, such as the display, the hard disk (HDD), wireless network cards, the optical drive, graphics processing unit (GPU), and the central processing unit (CPU). In the example embodiment, application manager 112 distinguishes the energy consumption between specific components and entire systems by referencing electric meters which are incorporated into both the entire system as well as the common electrical components of each system, such as the monitor and GPU. In an effort to further the accuracy of the measured baseline energy consumptions, application manager 112 not only measures the energy consumption of applications operated exclusively on a single system, but additionally operates and measures the energy consumption of individual components of each system when an application is operated across multiple systems. For example, application manager 112 will measure the energy consumption of a web browsing application when operated entirely on the local system as well as measure the energy consumption of both the local system and cloud system when the bulk of application processing is on the cloud system and only the display is utilized on the local system. In other embodiments, application manager 112 may measure the energy consumption of systems and components by measuring factors such as voltage, amperage, and resistance using electrical devices such as voltmeters, ammeters, and Ohmmeters. Application manager 112 records the energy consumption of individual components because during an application failover (when an application switches to an alternative system), some components and application functionality remain operating on the failback system (former system) as well as the failover system (current system). For example, while the central processing unit (CPU) of the cloud system (failover system) may be utilized to compute a spreadsheet, the display of the local system (failback system) is utilized to display the output. Additionally, recording individual component energy consumptions allows for maximum efficiency by determining when components necessary to operate applications overlap. Continuing the example above, if user Alpha is already operating a word processor which requires use of the display on the local device and opens a web browser which also requires use of the display on the local device, then application manager 112 subtracts the cost of operating the display from the web browser energy consumption estimate because the energy consumed by the display is already accounted for in the word processor energy consumption.

In addition to compiling the energy consumption statistics when each application is briefly operated on each system, application manager 112 continuously records the energy consumption of operating applications at all times and compiles the results into a database. By recording energy consumption of each system, application, and component continuously, application manager 112 is continuously building a database of consumption statistics for a variety of situations. As such, the energy consumption database details consumption statistics for the applications and components operated on each system, including average consumption, average consumption per hour of the day/month/year, consumption during active/passive application operation, consumption during peak/base system processing, consumption during high/low network traffic, consumption while specific applications are being operated on the same system/network, and the like. Furthermore, in the example embodiments, application manager 112 may periodically operate applications for sample periods on alternative systems to ensure that the recorded baseline energy consumption maintains accuracy. For example, a user may schedule application manager 112 to operate an application on a different system for five minutes once every two weeks to check/maintain the accuracy of the baseline record. If, during a periodic operation of an application on an alternative system, the baseline energy consumption on file differs significantly from the real-time energy consumption of the application (in the example embodiment, significantly is user-defined at ±10%), application manager 112 operates the application on the system for an extended sample duration (such as one hour) to establish the new baseline consumption. The duration of the extended sample period is set by the user and could vary significantly depending on how much time is needed to obtain an accurate consumption rate of the application. In other embodiments, baseline energy consumptions may be user input through a user interface locally or remotely via a network. Continuing the example above, if the user registers a local system (computing device 110), cloud system (computing device 120), and sibling system (computing device 130) as well as a web browser application, word processing application, and email client application, then application manager 112 establishes a baseline energy consumption value of each application on the necessary components of each system by monitoring the operation of the web browser, word processor, and email client on the local, cloud, and sibling systems and recording the energy consumption. Furthermore, because the security application is only configured to run on the local system, application manager 112 establishes a baseline energy consumption of the security application by monitoring the operation of the security application on the local system.

Application manager 112 references the application and system configuration as well as the baseline energy consumptions to determine the optimal system, or component of a system, to operate applications opened by the user (step 206). When computing device 110 receives a request to initiate an application, application manager 112 determines the optimal components/system for operating each application by first referencing the energy consumption database to determine which components of which system consume the least amount of energy when operating a particular application. In the example embodiment, a user may add, remove, modify, and designate which of the aforementioned energy consumption factors, such as average consumption at a time of day or network traffic, are considered in determining which components are more energy efficient for a particular application and time. The designated factors are then compared for each component and the component, or system as a whole, with the greatest efficiency is awarded a point for each factor at which the component/system is more efficient. The components with the most points are selected to operate the application so long as they are configured to do so (described below). For example, if the designated factor is average energy consumption per hour and the local system CPU processes the email client at an average of 30 mA per hour while the cloud system CPU processes the email client at an average of 20 mA per hour, then the cloud system CPU is awarded a point. In addition, if the network adapter is more efficient on the sibling system (computing device 130), then application manager 112 may process an email with the CPU of the cloud system, download the processed email with the network adapter of the sibling system, and then share the email with the local system. Furthermore, a user or administrator may also weigh said factors such that certain factors carry more significance than others. In the example embodiment, a user or administrator selects the factors for comparison based on the application, date, time, network latency, and any other factors relevant to the efficiency and operation of the application. Application manager 112 then references the application and system configurations to determine which components of which systems are capable of operating each application with respect to the configurations received in step 202. Continuing the example above, if processing the security application is most efficient on the cloud system CPU (computing device 120) however the application configuration prevents operation on any system other than the local system (computing device 110), then application manager 112 will operate the security application on the local system CPU even though it would be more efficient to operate it on the cloud system CPU.

Application manager 112 is further capable of detecting when connected systems are operating multiple instances of an application and enabling sibling sharing between the systems. Sibling sharing allows a single system to share processed information with other systems at a lesser cost than processing the information on each system. Sibling sharing is ideal for situations where multiple systems are accessing common information and one of said systems has already invested the energy in initializing/performing the startup sequence of an application, downloading the necessary files for operation, and creating files using received input and transmitted output. Application manager 112 detects when sibling sharing is feasible by communicating with application managers on other systems, such as application manager 132, and determining whether the same applications are performing identical (operating concurrently) operations. In the example embodiment, application manager 112 communicates with application manager 132 and shares processed information via network 108, however in other embodiments, virtual sharing may be achieved using other wireless or wired connections. If application manager 112 determines sibling system is running the same operations on the same application as the local system, then application manager 112 performs the bulk of the processing on a single system and transmits the processed product to other sibling systems. Continuing the example above, if application manager 112 detects that user Alpha on computing device 110 and user Beta on computing device 130 are opening the same web page with a web browsing application, then application manager 112 will process the web page with one of the two systems and then send the processed, static hypertext markup language (HTML) to the remaining systems. Like the energy consumptions factors designated earlier, sibling system sharing is a factor considered when determining which system is optimal for a particular application which may be assigned a user-designated point value.

In the example embodiment, application manager 112 monitors and displays application energy consumption through a user interface on the local device (step 208). In the example embodiment, real-time energy consumption of the currently operating applications with respect to each system and system components is displayed as well as average consumption over time. Furthermore, the user interface is customizable to show the consumption statistics and factors desired by the user. In addition to customizing the user interface, a user can also select an option to open the detailed statistics and charts recorded in the energy consumption database as well as compare the real-time consumption with recorded baseline consumptions. In the example embodiment, application manager 112 notifies users of uncharacteristic consumption, such as varying from the recorded baseline energy consumption by ±10%, and prompts a notification to the user. Continuing the example above, if user Alpha is operating the web browser application at an average of 30 mW per hour on the local system, an average consumption rate of 30 mW per hour is displayed on a user interface of computing device 110. Furthermore, user Alpha will receive a notification if the consumption of the web browsing application exceeds an average of 33 mW per hour and may access more detailed statistics recording the energy consumption of the web browser application by selecting a detailed statistics option.

Application manager 112 determines whether an application has been idle for a user-set period of inactivity (decision 210). In the example embodiment, application manager 112 determines which applications are capable of hibernation by referencing the application and system configurations received in step 204. Because some applications, such as the security application mentioned above, may be configured to never hibernate, application manager 112 only determines whether applications configured for hibernation are idle for the user-set period of time. Application manager 112 determines whether an application has been idle by monitoring the application and determining whether any actions taken are user-directed. If application manager 112 does not receive any user input or any indication of user interaction, such as mouse clicks, page scrolls, zooming in or out, etc., for the user-set period of inactivity, then energy consuming functionality of the application may be hibernated according to the hibernation configurations received in step 202.

If application manager 112 determines that an application has been idle for the user-set period of time (decision 210 "YES" branch), then application manager 112 hibernates the application (step 212). Hibernating an application involves temporarily suspending certain aspects or the entirety of application operation, depending on the received hibernation settings. Continuing the example above, if user Alpha has configured the email client to hibernate the process of checking for new mail after fifteen minutes, then application manager 112 hibernates the process of checking for new email after fifteen minutes of inactivity.

If application manager 112 determines that an application has not been idle for the user-set period of time (decision 210 "NO" branch), then application manager 112 determines whether an alternative system can run the application more efficiently with regards to energy consumption (decision 214). In the example embodiment, application manager 112 is constantly monitoring the power consumption of operating applications in step 208 and, by referencing the energy consumption baselines, can readily determine whether operating an application is more energy efficient on an alternative system or alternative system component. Application manager 112 compares the average, real-time consumption of an application with the baseline energy consumption of the same application on an alternative system. When applicable, multiple factors of the aforementioned consumption factors may be designated and compared similar to how the determination is made in step 206 above. In the example embodiment, application manager 112 averages the real time consumption over a user-set period of time, such as thirty seconds, such that periodic spikes or dips in consumption do not result in an unwarranted system switch. Continuing the example above where user Alpha is operating the web browsing application at an average of 30 mA per hour on the local system, if the average wattage per hour jumps to 50 mA per hour for greater than thirty seconds and the baseline consumption of the web browsing application on the cloud system averages 40 mA per hour, then application manager 112 determines that there is a more efficient system available.

If an alternative system cannot operate the application more efficiently than the current system (decision 214 "NO" branch), then application manager 112 continues monitoring and displaying the application energy consumption (step 208).

If an alternative system can operate the application more efficiently than the current system (decision 214 "YES" branch), then application manager 112 determines whether switching to the alternative system is feasible (decision 216). Application manager 112 determines whether switching the operation of an application to an alternative system is feasible by referencing the application and system configurations similar to how application manager 112 references the application and system configurations in step 206. Some applications, such as network applications and security applications, are incapable of remote operation and, therefore, must always be operated on the local system. Other applications may require operation on specific systems at specific times of day, certain times of the year, or during special circumstances such as power outages. After determining that an application is consuming more energy than the established baseline for the user-set duration, application manager 112 references the application and system configurations to determine whether the application is capable of alternative operation.

If application manager 112 determines that switching to an alternative system is infeasible (decision 216 "NO" branch), then application manager 112 continues monitoring and displaying the application energy consumption (step 208). For example, an accounting application may be more efficient when operated on the local system at the end of day, however the application configuration prohibits operating the accounting application on any system other than the cloud system at end of day when all transactions are centrally processed.

If application manager 112 determines that switching to an alternative system is feasible (decision 216 "YES" branch), then application manager 112 operates the application on the alternative system (step 218). In the example embodiment, operating the application on an alternative system, known as failover, seamlessly removes the bulk of the processing and energy consuming operations to a remote (failover) system while the user interface of the application remains on the former (failback) system. While an application is in failover mode, the application hibernates on the failback system such that the user interface functions properly, however processing, or parts of the processing, occur on a failover system determined to be more energy efficient, such as a cloud or a sibling system. When an application is hibernating during a failover, it may be woken up and reverted back (failover) to local processing at any time by the user selecting the application within the user interface and selecting an option to failback to the local system. Users and administrators may configure the wakeup and hibernation parameters for each application and in regards to each system such that each application may react differently to the application failover. For example, an administrator may set wakeup settings which only override hibernation in particular circumstances, such as during certain times of day or proof of a level of seniority.

Figure 3:
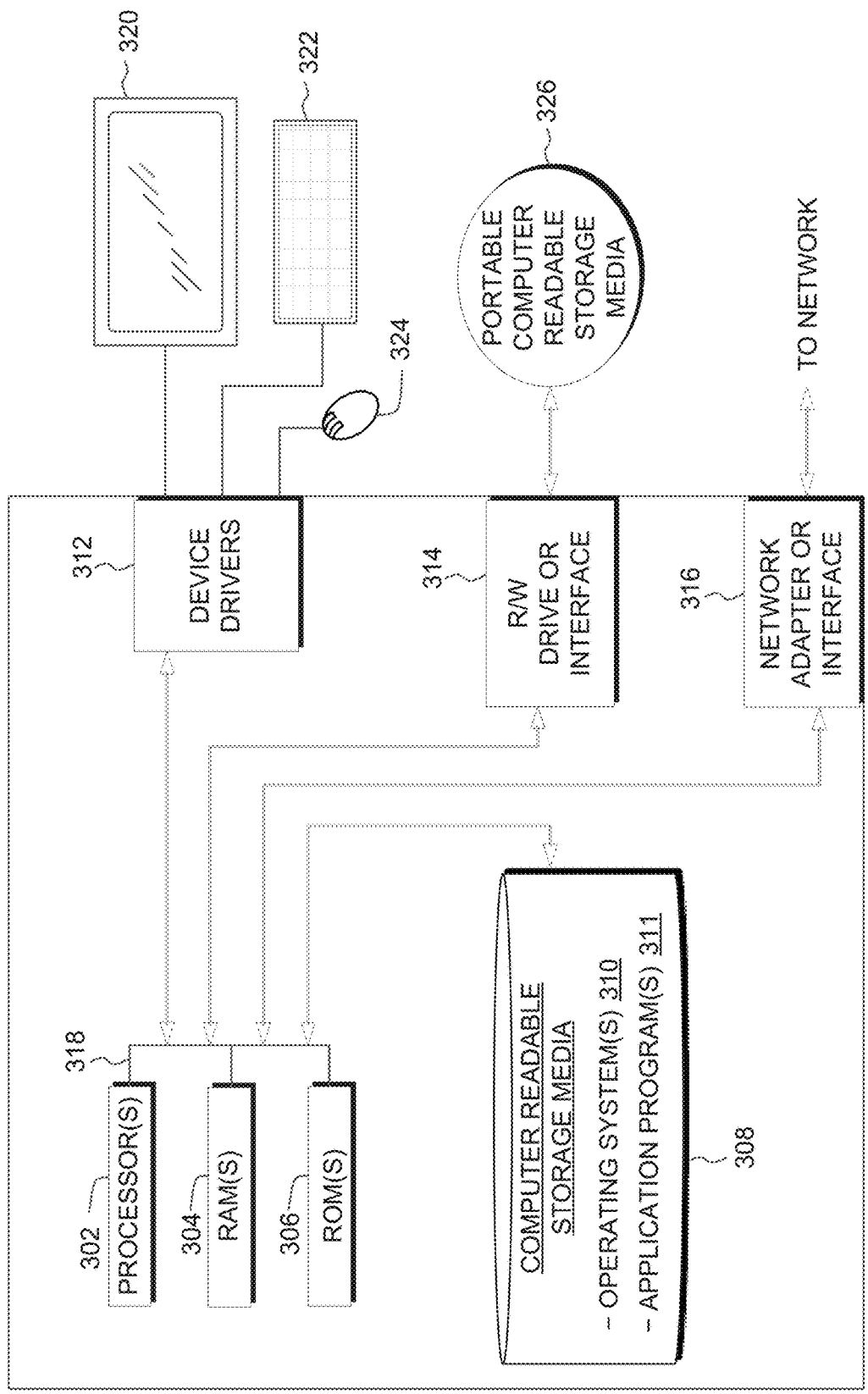
FIG. 3 is a block diagram depicting the hardware components of an application management system 100 of FIG. 1, in accordance with an embodiment of the invention.

FIG. 3 depicts a block diagram of components of computing device 110 of an efficient application management system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, application manager 112, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for application management, the method comprising:
   receiving an application and system configuration, wherein the application and system configuration details which of one or more systems each of one or more applications are configured to operate on;
   establishing baseline energy consumptions of each of the one or more applications on each of the one or more systems by briefly operating each of the one or more applications on each of the one or more systems and measuring an energy consumption of each of the one or more systems and individual energy consuming hardware components of each of the one or more systems;
   assigning operation of a first application of the one or more applications to a first system of the one or more systems based on the measured energy consumption of the first system being a least amount of the one or more systems while operating the first application;
   assigning operation of a second application of the one or more applications to a second system of the one or more systems based on the measured energy consumption of the second system being a least amount of the one or more systems while operating the second application;
   determining whether the second application of the one or more applications can operate with less energy consumption than it is currently operating with by:
     referencing the energy consumption baseline of the second application to obtain the energy consumption of the first system and individual energy consumptions of each one or more energy consuming hardware components of the first system, and
     comparing a real-time energy consumption of the energy consuming hardware component utilized by the second application on the second system with the obtained energy consumption of a same energy consuming hardware component on the first system; and
   operating the second application on the first system based on determining that the second application operates with less energy consumption when using the energy consuming hardware component of the first system than it is currently operating on the second system,
   wherein one or more steps of the above method are performed using one or more computers.

2. The method of claim 1, wherein the application and system configuration further details when the one or more applications are capable of hibernation, and the method further comprises a step of hibernating the second application, wherein the step of hibernating the second application further comprises:
   determining whether the second application is capable of hibernation by referencing the application and system configuration;
   based on determining that the second application is capable of hibernation, determining whether the second application has been idle for a set period of time; and
   based on determining that the second application has been idle for a set period of time, hibernating the second application.

3. The method of claim 2, further comprising:
   determining whether the hibernated second application has received a user input; and
   based on determining that the second application has received a user input, awakening the second application from hibernation.

4. The method of claim 1, wherein the one or more energy consuming hardware components of the first system include at least one of a central processing unit (CPU), a graphics processing unit (GPU), a memory, a storage, a network card, and a display.

5. The method of claim 1, further comprising a step of sibling sharing the second application, wherein the step of sibling sharing the second application further comprises:
   determining whether the second application is being operated concurrently on a sibling system, wherein the sibling system is associated with a system of the one or more systems that the second application is currently operating on; and
   based on determining that the second application is being operated concurrently on a sibling system, directing the system of the one or more systems that the second application is currently operating on to receive processed information from the sibling system, wherein receiving the processed information relieves the system of the one or more systems that the second application is currently operating on from at least one of: 1) utilizing energy in initializing the second application, 2) downloading one or more files, and 3) creating one or more files based on an input and an output.

6. The method of claim 1, further comprising:
   displaying a current energy consumption of the one or more applications being operated on the one or more systems.

7. The method of claim 1, wherein the step of measuring an energy consumption of each of the one or more applications with respect to the one or more systems each of the one or more applications are configured to operate on further comprises:
   recording the measured energy consumption of the one or more applications in an energy consumption database;
   measuring an average current energy consumption of the one or more applications on each of the one or more systems each of the one or more applications are configured to operate on at a user-set frequency;
   determining whether the average current energy consumption of the one or more applications is within a user-set range of the measured energy consumption for a user-set period of time; and
   based on determining that the average current energy consumption of the one or more applications is outside of the user-set range of the measured energy consumption for the user-set period of time, replacing the recorded energy consumption with the average current energy consumption in the energy consumption database.

* * * * *